US011454769B2

(12) United States Patent
Brinkley et al.

(10) Patent No.: US 11,454,769 B2
(45) Date of Patent: Sep. 27, 2022

(54) DETERMINING POINTING ACCURACY USING OPTICAL FIBER BUNDLE

(71) Applicant: X DEVELOPMENT LLC, Mountain View, CA (US)

(72) Inventors: Devin Brinkley, Redwood City, CA (US); Paul Csonka, Mountain View, CA (US); Sanam Mozaffari, San Jose, CA (US); Baris Ibrahim Erkmen, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 17/062,169

(22) Filed: Oct. 2, 2020

(65) Prior Publication Data

US 2022/0107473 A1    Apr. 7, 2022

(51) Int. Cl.
*H04B 10/00*  (2013.01)
*G02B 6/42*  (2006.01)
*H04B 10/69*  (2013.01)
*H04B 10/25*  (2013.01)
*H04B 10/112*  (2013.01)

(52) U.S. Cl.
CPC ......... *G02B 6/4225* (2013.01); *G02B 6/4227* (2013.01); *H04B 10/1121* (2013.01); *H04B 10/25* (2013.01); *H04B 10/691* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,606,020 A | * | 8/1986 | Ruffin | G02B 6/2808 385/51 |
| 4,696,062 A | * | 9/1987 | LaBudde | G02B 6/32 356/138 |
| 4,708,483 A | * | 11/1987 | Lorenz | G01B 11/26 356/3.07 |
| 5,005,979 A | * | 4/1991 | Sontag | G01B 11/002 250/458.1 |

(Continued)

FOREIGN PATENT DOCUMENTS

EP    1130808 A2    9/2001

OTHER PUBLICATIONS

International Search Report and Written Opinion for Application No. PCT/US2021/052647 dated Jan. 14, 2022.

*Primary Examiner* — Agustin Bello
(74) *Attorney, Agent, or Firm* — Botos Churchill IP Law, LLP

(57) ABSTRACT

A free-space optical communication device includes an optical fiber bundle and one or more processors. The optical fiber bundle includes a central fiber connected to a first photodetector, and a plurality of surrounding fibers, each surrounding fiber connected to a corresponding second photodetector. The one or more processors are in communication with the first photodetector and each second photodetector. The one or more processors are also configured to receive a current or voltage generated at the first photodetector and each second photodetector and to determine a pointing accuracy of a beam received at the optical fiber bundle based on the current or voltage generated at the second photodetectors.

17 Claims, 5 Drawing Sheets

(56) References Cited

U.S. PATENT DOCUMENTS

| | | | | |
|---|---|---|---|---|
| 5,142,400 A * | 8/1992 | Solinsky | H04B 10/1127 | 356/139.05 |
| 5,177,348 A * | 1/1993 | Laor | G02B 6/32 | 250/201.1 |
| 5,461,476 A * | 10/1995 | Fournier | G01N 21/474 | 250/227.28 |
| 5,930,419 A * | 7/1999 | Trouchet | G02B 6/12014 | 385/27 |
| 6,031,947 A * | 2/2000 | Laor | G02B 6/3504 | 385/16 |
| 6,239,888 B1 * | 5/2001 | Willebrand | H04B 10/1125 | 398/118 |
| 6,253,001 B1 * | 6/2001 | Hoen | G02B 6/3518 | 385/16 |
| 6,253,010 B1 * | 6/2001 | Belser | G02B 6/4227 | 356/400 |
| 6,330,102 B1 * | 12/2001 | Daneman | B81B 3/0021 | 359/290 |
| 6,388,789 B1 * | 5/2002 | Bernstein | B81B 3/0021 | 359/198.1 |
| 6,445,496 B1 * | 9/2002 | Presby | H04B 10/1121 | 359/366 |
| 6,456,751 B1 * | 9/2002 | Bowers | G02B 6/3588 | 385/16 |
| 6,539,142 B2 * | 3/2003 | Lemoff | G02B 6/359 | 385/52 |
| 6,556,285 B1 * | 4/2003 | Dickson | G02B 6/4227 | 356/121 |
| 6,567,574 B1 * | 5/2003 | Ma | H04Q 11/0005 | 385/16 |
| 6,587,611 B1 * | 7/2003 | Hunt | G02B 6/359 | 385/16 |
| 6,636,664 B2 * | 10/2003 | Snyder | G02B 6/3524 | 385/115 |
| 6,728,016 B1 * | 4/2004 | Hunt | G02B 6/3586 | 359/223.1 |
| 6,760,147 B2 * | 7/2004 | Tochio | G02B 6/3588 | 359/292 |
| 6,792,185 B1 * | 9/2004 | Ahrens | H04B 10/1121 | 356/400 |
| 6,813,057 B2 * | 11/2004 | Miller | G02B 6/358 | 359/290 |
| 7,050,670 B2 * | 5/2006 | Schroeder | G02B 6/32 | 385/17 |
| 7,174,065 B2 * | 2/2007 | Lacey | G02B 6/35 | 385/16 |
| 7,236,680 B1 * | 6/2007 | Jordan | G02B 6/4225 | 385/147 |
| 7,239,771 B2 * | 7/2007 | Ghandi | G02B 6/3502 | 385/16 |
| 7,379,641 B1 * | 5/2008 | Johnson | G02B 6/4222 | 385/115 |
| 8,131,123 B2 * | 3/2012 | Presley | G02B 6/29313 | 385/18 |
| 8,301,032 B2 * | 10/2012 | Majumdar | H04B 10/1123 | 398/170 |
| 8,730,556 B2 * | 5/2014 | Chau | G02B 6/3546 | 359/290 |
| 8,817,359 B2 * | 8/2014 | Chau | G02B 26/002 | 359/290 |
| 9,338,528 B2 * | 5/2016 | Borkenhagen | H04Q 11/0005 | |
| 9,973,274 B1 * | 5/2018 | Graves | H04B 10/1123 | |
| 10,411,797 B1 * | 9/2019 | Mitchell | G02B 6/4249 | |
| 2002/0181848 A1 * | 12/2002 | Lemoff | G02B 6/359 | 385/18 |
| 2003/0169422 A1 * | 9/2003 | Mukai | G02B 6/4225 | 356/399 |
| 2004/0022498 A1 * | 2/2004 | Medberry | G02B 6/4227 | 385/52 |
| 2004/0223688 A1 * | 11/2004 | Jeong | G02B 6/4225 | 385/25 |
| 2006/0093270 A1 * | 5/2006 | Fenwick | G02B 6/389 | 385/57 |
| 2017/0052334 A1 * | 2/2017 | Graves | G02B 6/32 | |

* cited by examiner

118A

118B

DETERMINING POINTING ACCURACY USING OPTICAL FIBER BUNDLE

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to monitor the beacon laser and extract necessary information to locate the transmitting terminal. Steering mechanisms may use this information to maneuver the terminals (or the optical paths in the terminals) to point toward each other and to actively track the alignment once acquisition is established. Lenses and mirrors at the receiving terminal may further direct a received laser towards components configured to capture and process the received laser. A high degree of pointing accuracy may be required to ensure that the optical signal will be correctly received.

BRIEF SUMMARY

Aspects of the disclosure provide for a free-space optical communication device that determines the location of the remote terminal and the pointing direction of the laser beams without the need of a separate beacon laser or a separate tracking sensor. The FSOC device may determine the location of the remote terminal or the pointing direction of the laser beams by using an optical fiber bundle to receive the data-carrying communication beams and by deriving the necessary pointing information form the relative energy captured by each fiber in the bundle.

Aspects of the disclosure provide for a free-space optical communication device that includes an optical fiber bundle and one or more processors in communication with the first photodetector and each second photodetector. The optical fiber bundle includes a central fiber connected to a first photodetector, and a plurality of surrounding fibers, each surrounding fiber connected to a corresponding second photodetector. The one or more processors are configured to receive a current or voltage generated at the first photodetector and each second photodetector; and determine a pointing accuracy of a beam received at the optical fiber bundle based on the current or voltage generated at the second photodetectors.

In one example, the optical fiber bundle includes four surrounding fibers. In this example, the central fiber optionally has a diameter of 130 microns, and the four surrounding fibers optionally have diameters of 200 microns. In another example, the device also includes a focusing system configured to direct the beam received by the free-space optical communication device to the optical fiber bundle. In this example, the one or more processors are also optionally configured to adjust the focusing system based on the determined pointing accuracy of the beam. Alternatively in this example, the focusing system includes a tip-tilt mirror.

In a further example, the one or more processors are configured to determine the pointing accuracy of the beam based on a location of a centroid of the beam relative to a center of the optical fiber bundle. In this example, the one or more processors are optionally configured to determine the location of the centroid of the beam relative to the center of the optical fiber bundle based on an amount of power received through each surrounding fiber over a period of time, and an offset of a center of each surrounding fiber from a center of the central fiber.

Other aspects of the disclosure provide for a method for determining a pointing accuracy for an optical beam. The method includes receiving, at an optical fiber bundle that includes a central fiber and a plurality of surrounding fibers, an optical beam; generating, at each photodetector of a plurality of photodetectors configured to receive beam portions from the plurality of surrounding fibers in the optical fiber bundle, a current or voltage based on the received optical beam; determining, by one or more processors in communication with the plurality of photodetectors, a pointing accuracy of the received optical beam relative to the central fiber based on the generated currents or voltages; and adjusting, by the one or more processors, the received optical beam using a focusing system based on the determined pointing accuracy.

In one example, the plurality of surrounding fibers is four fibers having a same diameter. In another example, the method also includes receiving, at each photodetector of the plurality of photodetectors, a portion of the optical beam received at a fiber in the plurality of surrounding fibers. In this example, the generating, at each photodetector, of the current or voltage based on the received optical beam optionally includes generating the current or voltage relative to an amount of energy in the portion of the optical beam.

In a further example, the determining of the pointing accuracy of the received optical beam includes determining a location of a centroid of the received optical beam relative to the optical fiber bundle. In this example, the determining of the location of the centroid of the received optical beam relative to the optical fiber bundle optionally includes combining electrical signals generated at each photodetector of the plurality of photodetectors into a single signal. Further in this example, the combining of electrical signals includes summing the voltage or current received at each photodetector of the plurality of photodetectors over a period of time; multiplying the summed voltage or current of a given photodetector with an offset of a center of a corresponding surrounding fiber relative to a center of the central fiber to obtain a product for each photodetector; and summing the products of each photodetector. Alternatively in this example, the location of the centroid includes Cartesian coordinates. Also alternatively in this example, the location of the centroid includes an angle of incidence.

In yet another example, the adjusting of the received optical beam using a focusing system based on the determined pointing accuracy includes moving a mirror in the focusing system. In a still further example, the method also includes extracting data from the received beam based on a modulation of a total current or voltage generated at the plurality of photodetectors and a second photodetector configured to receive a beam portion from the central fiber.

Further aspects of the disclosure provide for a tangible, non-transitory computer-readable storage medium configured to store instructions. The instructions, when executed by one or more processors, cause the one or more processors to perform a method. The method includes receiving a current or voltage from each photodetector of a plurality of photodetectors configured to receive portions of an optical beam from a plurality of fibers in an optical fiber bundle, the plurality of fibers surrounding a central fiber of the optical fiber bundle; determining a pointing accuracy of the optical beam relative to the central fiber based on the received currents or voltages; and adjusting the optical beam using a focusing system based on the determined pointing accuracy.

DETAILED DESCRIPTION

Overview

The technology relates to a multi-core fiber bundle for a free-space optical communications (FSOC) system. Because optical beams in a FSOC link are very narrow (e.g., 1/500th of a degree), the beams between two terminals need to be accurately pointed so that they illuminate the receive-terminal aperture and yield good performance. For example, a requirement of less than 5 microradians (~1 arcsecond) root-mean-square pointing error may exist for the pointing accuracy for a communication device. By using a multi-core fiber bundle, the pointing accuracy of a communication beam may be determined and adjusted without the need for separate architecture for processing a beacon beam, thereby eliminating the need for (1) a separate beacon laser transmitted from the remote terminal, (2) a separate tracking receiver path on the local terminal (along with dedicated optics, optomechanics and electrooptics), and (3) precision alignment of the optical paths (i.e., the boresight) between the beacon beam receiver and the communication beam receiver.

For example, a communication beam may be received by the communication device and focused onto an optical fiber bundle inside the device. The angle of incidence of the received communication beam may be determined by the displacement of the focused beam on the surface of the fiber bundle, which can be calculated using measurements of the energy collected by each fiber in the bundle. This angle may be used to provide feedback to adjust the pointing of the communication beam relative to the optical fiber bundle of the FSOC system, such as by moving tilting a mirror in the FSOC system.

The features of the technology described herein may allow for a more accurate alignment between two communication devices. In particular, the features of the technology described herein may allow for using a single laser beam (referred to as the "communication beam") for both transmitting data, and providing the necessary tracking information for accurate pointing. The boresight error that typically exists between a beacon beam detector and a communication beam detector may therefore be eliminated, and a higher coupling efficiency of the laser beam to the central fiber may be achieved. The performance of the communication device may also be better through the lifetime of the system. The architecture of a given communication device may be simplified, as well as made cheaper and smaller in size, by removing components related to transmitting and receiving a beacon beam.

Example Systems

Figure 1:
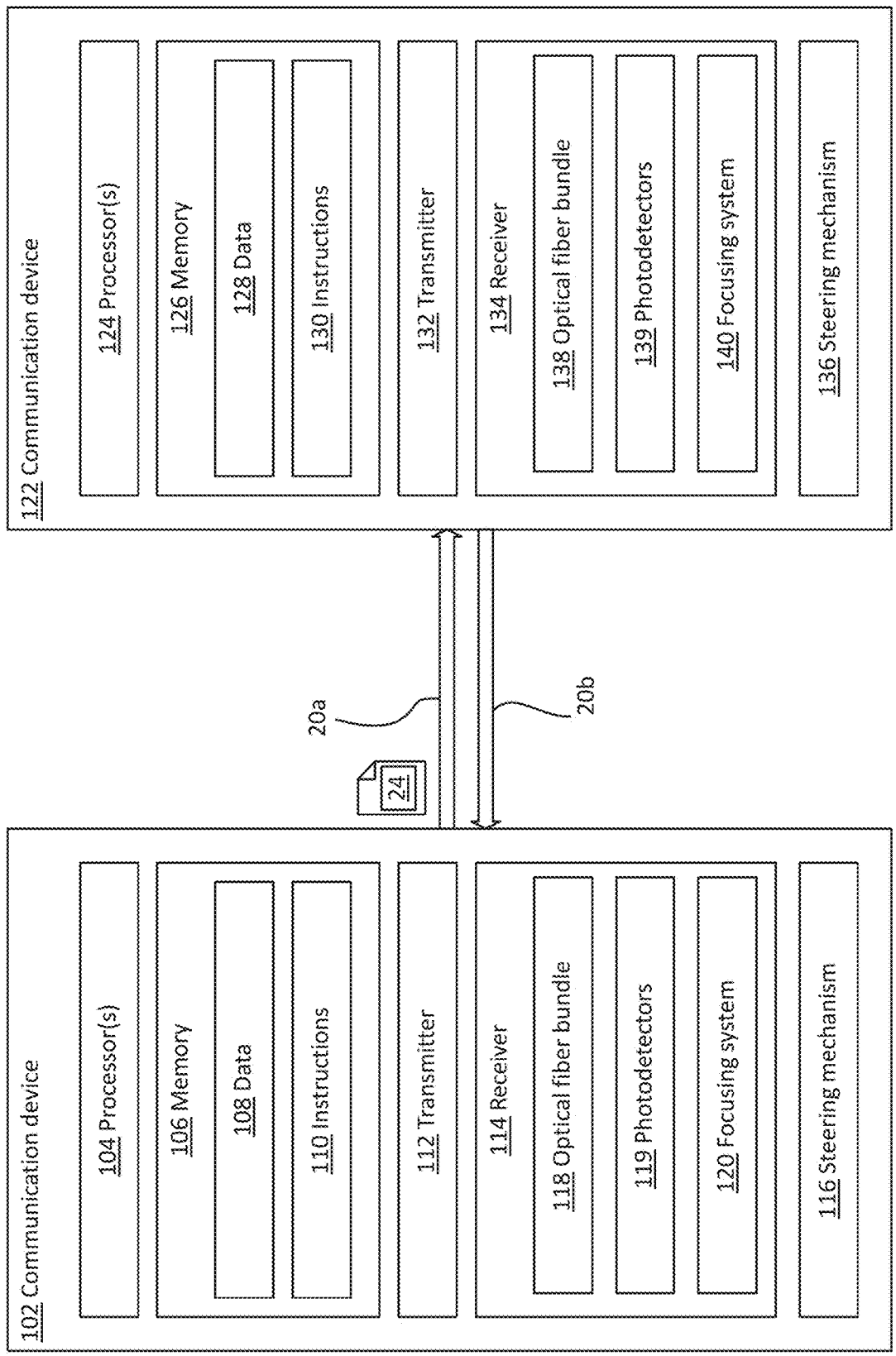
FIG. 1 is a block diagram 100 of a first communication device and a second communication device in accordance with aspects of the disclosure.

FIG. 1 is a block diagram 100 of a first communication device of a first communication terminal configured to form one or more links with a second communication device of a second communication terminal, for instance as part of a system such as a free-space optical communication (FSOC) system. For example, a first communication device 102 includes one or more processors 104, a memory 106, a transmitter 112, a receiver 114, and a steering mechanism 116.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information, such as one or more offsets determined for tracking a signal, may be stored.

Data 108 may be retrieved, stored or modified by the one or more processors 104 in accordance with the instructions 110. For instance, although the system and method is not limited by any particular data structure, the data 108 may be stored in computer registers, in a relational database as a table having a plurality of different fields and records, XML documents or flat files. The data 108 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 108 may comprise any information sufficient to identify the relevant information, such as numbers, descriptive text, proprietary codes, references to data stored in other areas of the same memory or different memories (including other network locations) or information that is used by a function to calculate the relevant data.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 may be in communication with the transmitter 112 and the receiver 114. Transmitter 112 and receiver 114 may be part of a transceiver arrangement in the communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may be configured to output an optical communication beam 20a that allows one communication device to communicate with another. For example, the transmitter 112 may include a light-emitting diode (LED), a laser diode, or other type of semi-conductor device. In some examples, the transmitter 112 may include a fiber laser or a solid state laser. Laser diodes may be directly modulated, or in other words, the light output may be controlled by a current applied directly to the transmitter 112. The transmitter 112 may include a single-mode laser diode that supports one optical mode, or the transmitter 112 may include a multimode laser diode that supports multiple-transverse optical modes. The transmitter 112 may receive a modulated communication signal from a modulator (not shown), which modulates a received electrical signal. The transmitter 112 may then convert the modulated electrical signal into an optical communication signal 24 that is configured to establish a communication link with another communication device, and then output the optical communication beam 20a carrying the optical communication signal 24 from the first communication device 102.

In some examples, the communication signal 24 may be a signal configured to travel through free space, such as, for example, a radio-frequency signal or optical signal.

The transmitter 112 of the first communication device 102 may be configured to transmit a beam to establish a communication link with the second communication device 122, which receives the beam. When the second communication device 122 receives the beam, the second communication device 122 may establish a line-of-sight with the first communication device 102 or otherwise align with the first communication device. As a result, the communication link that allows for the transmission of the optical communication beam 20 from the first communication device 102 to the second communication device 122 may be established.

The receiver 114 may include an optical fiber bundle 118, a plurality of photodetectors 119, and a focusing system 120 configured to direct the optical communication beam to the optical fiber bundle 118. The focusing system may also include one or more lenses, a mirror, a gimbal, or other system configured to relay and/or focus a received optical communication beam to the optical fiber bundle 118. Each optical fiber in the optical fiber bundle 118 may then relay portions of the received optical communication beam to a photodetector of the plurality of photodetectors 119. The receiver 114 may also include at least one processor of the one or more processors 104 configured to process electrical signals that are generated by the plurality of photodetectors 119.

Furthermore, the one or more processors 104 may be in communication with the steering mechanism 116 (such as a mirror or a gimbal) for adjusting the pointing direction of the transmitter 112, receiver 114, and/or optical communication beam. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical beam in at least two degrees of freedom, such as, for example, yaw and pitch. The adjustments to the pointing direction may be made to establish acquisition and connection link between the first communication device 102 and the second communication device 122. In addition, the adjustments may optimize transmission of light from the transmitter and/or reception of light at the receiver. In some implementations, the one or more processors 104 may provide closed loop control for the steering mechanism 116 to adjust pointing direction based upon the optical beam received over the communication link from a transmitting communication device, such as an optical beam received over the communication link from the second communication device 122.

The one or more processors 104 may also be in communication with the focusing system 120 for adjusting a pointing direction and/or a focus length of a received optical communication beam at the receiver 114. The adjustments may include moving a mirror, such as by altering an angle of a tip-tilt mount attached to the mirror, to change an angle of incidence of the optical communication beam at the optical fiber bundle 118. Additionally or alternatively, the adjustments may include moving a position of a lens relative to the optical fiber bundle 118 to change the focal length of the optical communication beam.

Figure 2A:
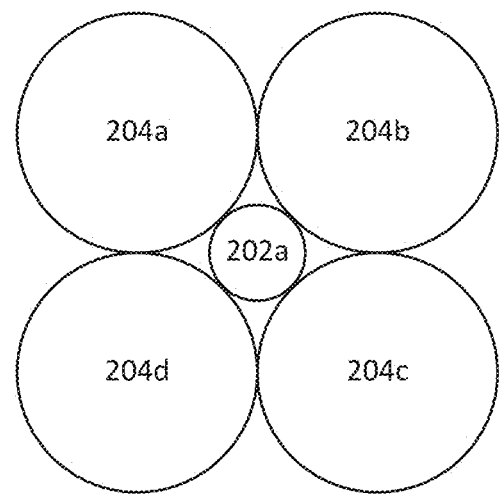
FIGS. 2A and 2B are pictorial diagrams of example optical fiber bundles in accordance with aspects of the disclosure.
Figure 2B:
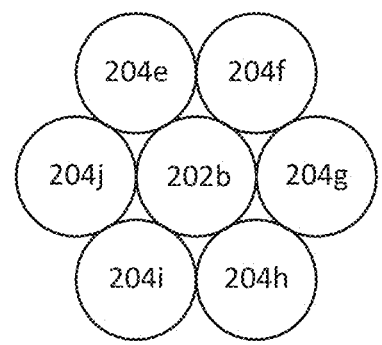

As shown in FIGS. 2A and 2B the optical fiber bundle 118A may include a central fiber 202 and a plurality of surrounding fibers 204. The central fiber 202 may be single mode or dual-core fiber, used for both transmitting and receiving laser beams. The plurality of surrounding fibers 204 may have a greater diameter than the central fiber 202. In one example, each of the surrounding fibers may be at least approximately 200 microns in diameter, and the central fiber may be at least approximately 130 microns in diameter. In this example, there may be four surrounding fibers arranged around the central fiber. As shown in FIG. 2A, a central fiber 202a is surrounded by fibers 204a, 204b, 204c, and 204d. A cross-section of the optical fiber bundle 118A in this example shows a first surrounding fiber 204a in the top left quarter, a second surrounding fiber 204b in the top right quarter, a third surrounding fiber 204c in the bottom right quarter, and a fourth surrounding fiber 204d in the bottom left quarter. The central fiber 202a is positioned at a center of the optical fiber bundle. In this arrangement, the optical fiber bundle may be at least approximately 560 microns in width and at least approximately in height. The diameters of the surrounding fibers 204a, 204b, 204c, and 204d are the same, and are greater than the diameter of the central fiber 202a. The diameters and arrangement of the fibers may be such that each surrounding fiber is in contact with the central fiber and two neighboring surrounding fibers. The first surrounding fiber 204a is in contact with fibers 202a, 204b, and 204d. The second surrounding fiber 204b is in contact with fibers 202a, 204a, and 204c. The third surrounding fiber 204c is in contact with fibers 202a, 204b, and 204d. The fourth surrounding fiber 204d is in contact with fibers 202a, 204a, and 204c.

In an alternative example, the plurality of surrounding fibers 204 may have diameters equal to the diameter of the central fiber 202. In this example, there may be six surrounding fibers arranged around the central fiber. As shown in FIG. 2B, a central fiber 202b is surrounded by fibers 204e, 204f, 204g, 204h, 204i, and 204j. A cross-section of the optical fiber bundle 118B in this example shows, arranged clockwise around the central fiber 202b, a first surrounding fiber 204e, a second surrounding fiber 204f, a third surrounding fiber 204g, a fourth surrounding fiber 204h, a fifth surrounding fiber 204i, and a sixth surrounding fiber 204j. Each surrounding fiber may be in contact with the central fiber and two neighboring surrounding fibers. Other numbers of surrounding fibers having different diameters may be in the optical fiber bundle than those described above while maintaining the condition that each surrounding fiber is in contact with the central fiber and two neighboring surrounding fibers.

Each fiber in the optical fiber bundle 118 is connected to a photodetector in the plurality of photodetectors 119. In this way, a photodetector array may be included in the first communication device 102 including the plurality of photodetectors 119 that correspond to the fibers in the optical fiber bundle 118. Each photodetector may be configured to receive a beam from its respective fiber and convert the received beam to an electrical signal carrying data using, for example, the photoelectric effect. The voltage or current of the electrical signal generated at each photodetector may be summed together. In one example, the current from each photodetector may optionally be scaled before being summed together prior to reaching a transimpedance amplifier (TIA). In another example, the voltage may be optionally scaled before being summed together and after first passing through the TIA.

The electrical signals generated at the output of each photodetector may be used to calculate the angle information needed for the tracking the optical communication beam (e.g., by calculating a centroid), while they are simultaneously combined into one signal for extracting the data bits most efficiently. At least one processor of the one or more processors 104, such as a processor at the receiver 114, may be configured to combine the electrical signals. The electrical signals may be combined in a number of different ways known in the field, such as by directly summing the signals (known as "equal-gain combining"), or weighting and filtering the signals prior to summing (in order to suppress the signals that have lower signal-to-noise ratio), or digitizing and processing the signals in a nonlinear manner for optimal combining (e.g., maximum-likelihood combining).

Similarly, the second communication device 122 includes one or more processors, 124, a memory 126, a transmitter 132, a receiver 134, and a steering mechanism 136. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output an optical communication beam 20b. Transmitter 132 of the second communication device 122 may output a beam to establish a communication link with the first communication device 102, which receives the beam. As such, when the first communication device 102 receives the beam, the first communication device 102 may establish a line-of-sight with the second communication device 122 or otherwise align with the second communication device. As a result, a communication link, that allows for the transmission of the optical communication beam 20b from the second communication device 122 to the first communication device 102, may be established. Like the receiver 114, the receiver 134 includes an optical fiber bundle 138, a plurality of photodetectors 139 having a photodetector corresponding to each optical fiber in the optical fiber bundle 138 and configured to receive an optical beam from the corresponding optical fiber, and a focusing system 140 configured to direct the optical communication beam to the optical fiber bundle 138 with the same or similar features as described above with respect to the receiver 114. The one or more processors 124 may be in communication with the steering mechanism 136 (such as a mirror or a gimbal) for adjusting the pointing direction of the transmitter 132, receiver 134, and/or optical communication beam, in a same or similar way as described above with respect to the one or more processors 104 and the steering mechanism 116. The one or more processors 124 may also be in communication with the focusing system 140 for adjusting a pointing direction and/or a focus length of a received optical communication beam at the receiver 134, in a same or similar way as described above with respect to the one or more processors 104 and the focusing system 120.

As shown in FIG. 1, the optical communication beams 20a, 20b may be transmitted between the first communication device 102 and the second communication device 122 when the transmitters and receivers of the first and second communication devices are aligned. The one or more processors 104 can send communication signals to the second communication device 122 via optical communication beam 20a, and the one or more processors 124 can send communication signals to the first communication device 102 via optical communication beam 20b. In some examples, a communication link between the first and second communication devices 102, 122, which allows for the bi-directional transmission of data between the two devices may be established for transmitting the communication signals between two devices. In other examples, separate communication links may be established for each transmission direction. The communication links in these examples may be FSOC links, radio-frequency links, or another type of communication link capable of travelling through free space.

In some implementations, the second communication device 122 may be configured differently than the first communication device 102, but is otherwise still able to communicate with the first communication device 102 using the optical communication beams 20a, 20b. For example, the second communication device 122 may have fewer or more components. The second communication device 122 may additionally or alternatively have a different type of component than is described above with respect to the first communication device 102.

Figure 3:
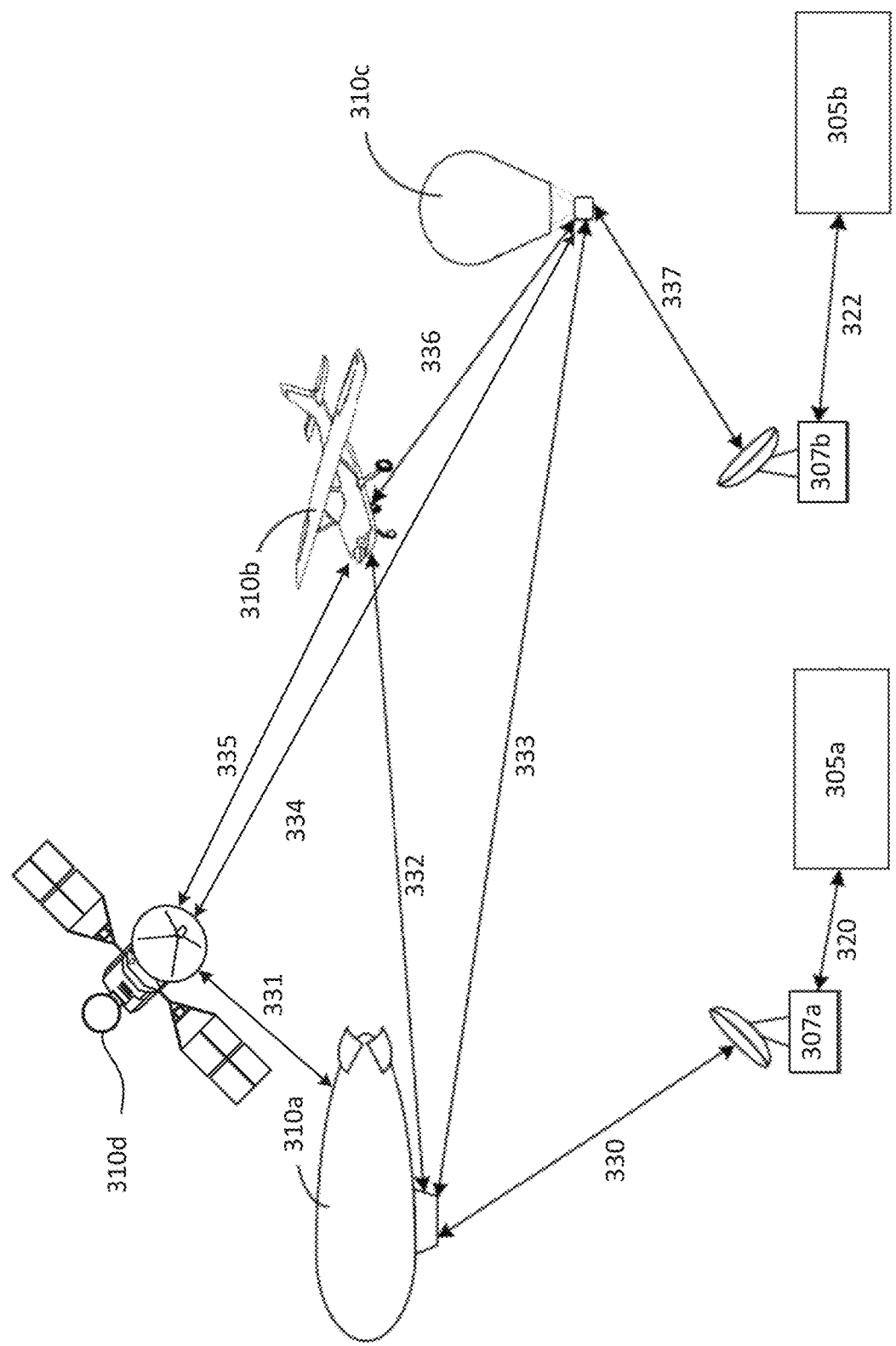
FIG. 3 is a pictorial diagram of a network 300 in accordance with aspects of the disclosure.

As shown in FIG. 3, a plurality of communication devices, such as the first communication device 102 and the second communication device 122, may be configured to form a plurality of communication links between a plurality of communication terminals and form a network 300. For example, the communication terminals in network 300 include two land-based datacenters 305a and 305b (generally referred to as datacenters 305), two ground terminals, or ground stations, 307a and 307b (generally referred to as ground stations 307), and four airborne high altitude platforms (HAPs) 310a-310d (generally referred to as HAPs 310). As shown, HAP 310a is a blimp, HAP 310b is an airplane, HAP 310c is a balloon, and HAP 310d is a satellite. Arrows shown between a pair of communication terminals represent possible communication links 320, 322, 330-337 between the communication terminals.

The network 300 as shown in FIG. 3 is illustrative only, and in some implementations the network 300 may include additional or different communication terminals. For example, in some implementations, the network 300 may include additional HAPs, which may be balloons, blimps, airplanes, unmanned aerial vehicles (UAVs), satellites, or any other form of high altitude platform, additional ground communication terminals, or other types of communication terminals. In alternate implementations, the network 300 is a terrestrial network comprising a plurality of communication devices on a plurality of ground communication terminals. The network 300 may be an FSOC network that includes communication terminals having communication devices equipped to perform FSOC, such as the first communication device 102 and the second communication device 122. In other implementations, the network 300 may additionally or alternatively be equipped to perform other forms of communication, such as radio-frequency communications.

In some implementations, the network 300 may serve as an access network for client devices such as cellular phones, laptop computers, desktop computers, wearable devices, or tablet computers. The network 300 also may be connected to a larger network, such as the Internet, and may be configured to provide a client device with access to resources stored on or provided through the larger computer network. In some implementations, HAPs 310 can include wireless transceivers associated with a cellular or other mobile network, such as eNodeB base stations or other wireless access points, such as WiMAX or UMTS access points. Together, HAPs 310 may form all or part of a wireless access network. HAPs 310 may connect to the datacenters 305, for example, via backbone network links or transit networks operated by third parties. The datacenters 305 may include servers hosting applications that are accessed by remote users as well as systems that monitor or control the components of the network 300. HAPs 310 may provide wireless access for the users, and may route user requests to the datacenters 305 and return responses to the users via the backbone network links.

Example Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

Figure 4:
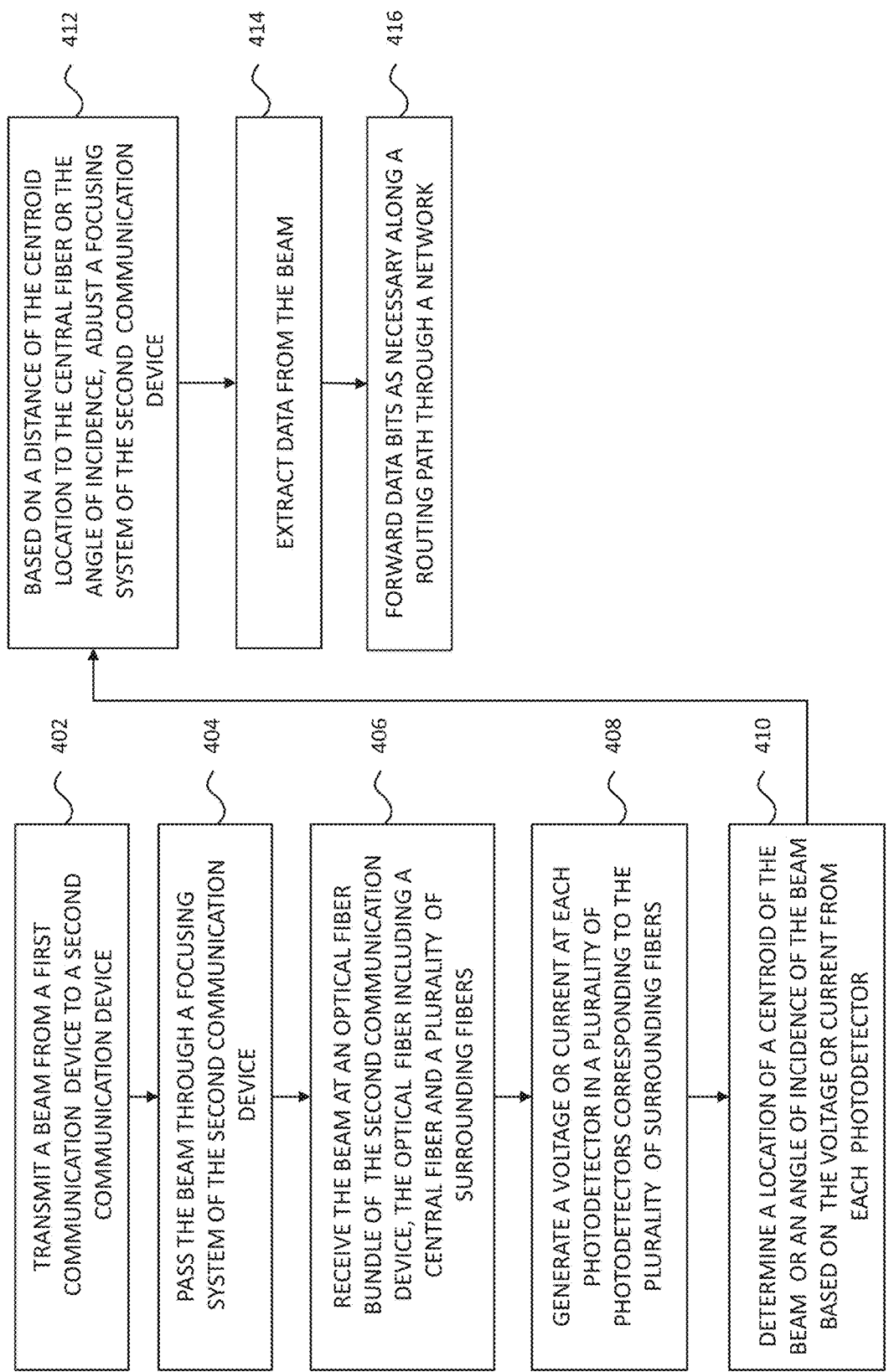
FIG. 4 is a flow diagram 400 in accordance with aspects of the disclosure.

Using an optical fiber bundle, a pointing accuracy of a receive optical beam may be determined and adjusted in order to increase coupling of the optical beam with the optical fiber bundle. When this technique is implemented, a separate tracking system may be omitted from the communication device, thereby eliminating (1) hardware and software components needed for a separate beacon laser transmitter on the remote terminal, (2) hardware and software components needed for a separate tracking receiver on the local terminal, and (3) precision alignment of the optical paths (i.e., the boresight) between the beacon beam receiver and the communication beam receiver. In FIG. 4, flow diagram 400 is shown that describes an implementation of this technique using the optical fiber bundle. The blocks in the flow diagram 400 may be performed by the one or more processors 104 of the first communication device 102 and/or the one or more processors 124 of the second communication device 122. While FIG. 4 shows blocks in a particular order, the order may be varied and that multiple operations may be performed simultaneously. Also, operations may be added or omitted.

At block 402, one or more first processors 104 of the first communication device 102 may use a transmitter 112 to transmit a beam to the second communication device. The beam may be an optical communication beam carrying data to be relayed to a destination node in a network, such as optical communication beam 20a. Conversely, the second communication device 122 may receive the beam from the first communication device 102 at a receiver 134.

At block 404, the received beam may pass through a focusing system 140 of the second communication device 122. The focusing system 140 directs the received beam towards an optical fiber bundle 138 of the second communication device 122. For example, one or more lenses may focus the received beam to have a same or similar diameter as the optical fiber bundle 138 or a central fiber 202 of the optical fiber bundle 138. Additionally or alternatively, one or more lenses or a mirror may refract or reflect the received beam to an angle towards the optical fiber bundle 138.

At block 406, the received beam may be received at the optical fiber bundle 138 of the second communication device 122. The optical fiber bundle 138 includes a central fiber 202 and a plurality of surrounding fibers 204. Each fiber of the optical fiber bundle 138 may direct a received portion of the beam towards a corresponding photodetector of a plurality of photodetectors 139 of the second communication device 122. When a center of the received beam falls on an area of the optical fiber bundle 138, one or more fibers in the area may receive portions of the beam that has a higher amount of energy than portions that other fibers outside of the area receive. In addition, a fiber closer to the area may receive a portion of the beam that has a higher amount of energy than a portion that a fiber farther away from the area receives. In some scenarios, one or more fibers may receive no portion of the beam when the received beam does not fall on the one or more fibers, in which case no energy is received at the corresponding one or more photodetectors.

Figure 5:
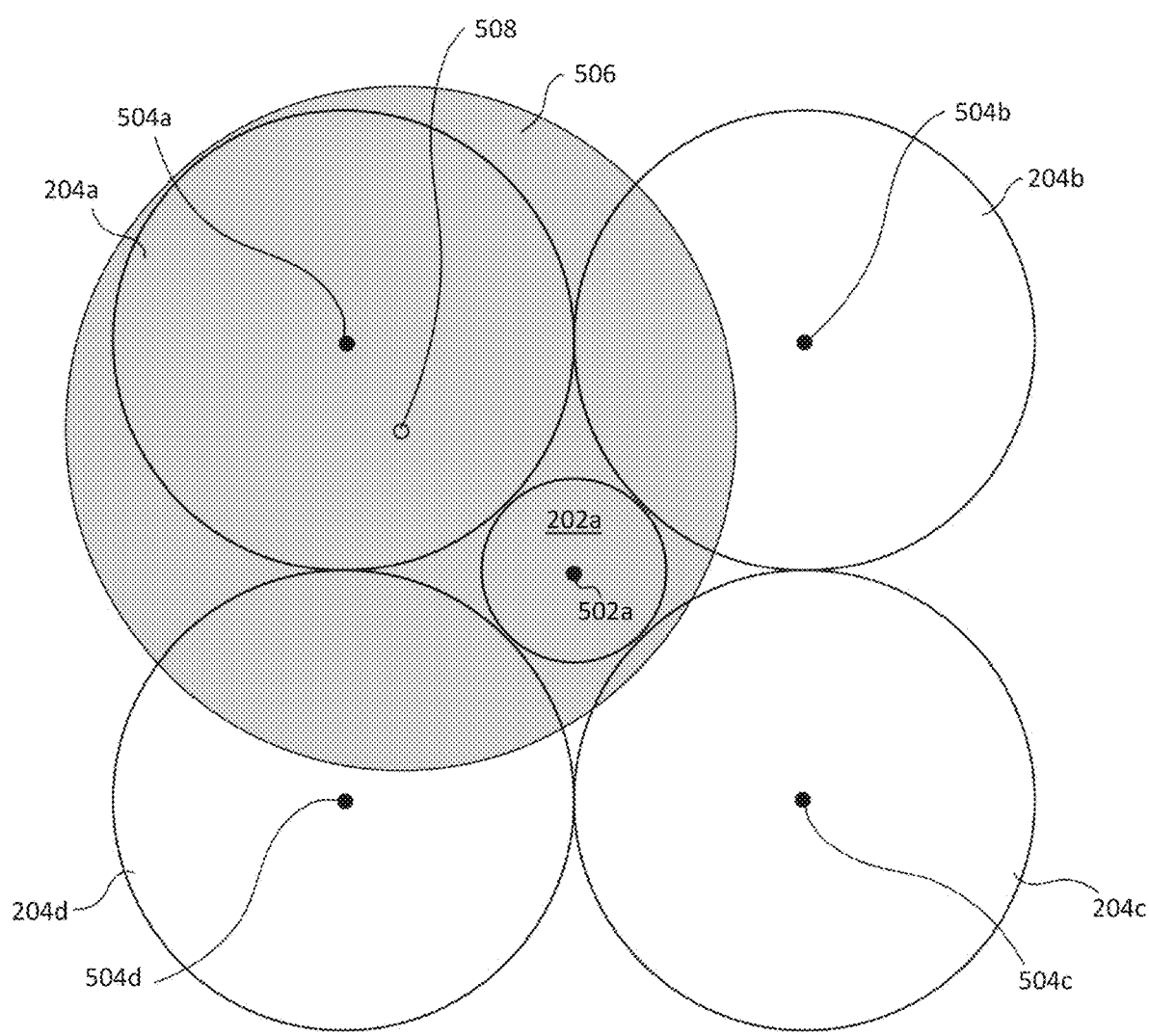
FIG. 5 is a pictorial diagram of an example scenario 500 in accordance with aspects of the disclosure.

As shown in example scenario 500 in FIG. 5, a received beam 506 may be received at optical fiber bundle 138, which is arranged the same as optical fiber bundle 118A in FIG. 2A. As described above, the optical fiber bundle 138 includes central fiber 202a, first surrounding fiber 204a, second surrounding fiber 204b, third surrounding fiber 204c, and fourth surrounding fiber 204d. Each of these fibers has centers 502a, 504a, 504b, 504c, and 504d, respectively. The received beam 506 has a center 508, which falls on the first surrounding fiber 204a. In addition, a greatest percentage of the cross-section of the first surrounding fiber 204a is covered by a first portion of the received beam 506, about 100%; about 33% of the cross-section of the fourth surrounding fiber 204d is covered by a second portion of the received beam 506; about 25% of the cross-section of the second surrounding fiber 204b is covered by a third portion of the received beam 506; and about 1% of the cross-section of the third surrounding fiber 204c is covered by a fourth portion of the received beam 506. As a result, the first surrounding fiber 204a directs a highest amount of energy to a corresponding photodetector, followed by, in descending order, the fourth surrounding fiber 204d, the second surrounding fiber 204b, and the third surrounding fiber 204c. A first photodetector may correspond with the first surrounding fiber 204a, a second photodetector may correspond with the second surrounding fiber 204b, a third photodetector may correspond with the third surrounding fiber 204c, and a fourth photodetector may correspond with the fourth surrounding fiber 204d.

At block 408, voltage or current may be generated at each photodetector in the plurality of photodetectors 139. For example, a given photodetector may convert the portion of the beam received from the corresponding optical fiber to an electrical signal carrying data. The voltage or current of the electrical signal corresponds to an amount of energy in the portion of the beam. In the scenario 500, the first photodetector corresponding to the first surrounding fiber 204a may output a highest voltage or current, followed by, in descending order, the fourth photodetector corresponding to the fourth fiber 204d, the second photodetector corresponding to the second surrounding fiber 204b, and the third photodetector corresponding to the third surrounding fiber 204c.

At block 410, one or more processors 124 may determine a location of a centroid of the received beam (or a center of irradiance) or an angle of incidence of the received beam based on the voltage or current from each photodetector. In particular, the voltage or current received at each photodetector corresponding to a surrounding fiber may be summed over a period of time, such as approximately 10 milliseconds to 1 seconds, and then voltage or current over the period of time may be compared. When the voltage or current generated at each photodetector corresponding to a surrounding fiber over the period of time is the same, the laser beam is determined to be centered on the central fiber. For example, a centroid location of the received beam may be calculated by multiplying the total voltage or current or the total power generated over the period of time with an (x,y) offset of a center of the corresponding fiber of a given photodetector from a center of the central fiber, and summing all the resulting products to obtain (x,y) coordinates for the centroid location, (a,b). The centroid location may be converted to an angle of incidence for the laser beam using the coordinates (a,b) and a focal length c of a focusing system of the second communication device. For instance, when a steering mechanism is configured to move along two axes, the centroid location may first be converted to a first angle along a first axis of the steering mechanism and a second angle along a second axis of the steering mechanism. In this example, the first angle is arctan(a/c), and the second angle is arctan(b/c). The first angle and the second angle may be combined, such as by summing, to determine the angle of incidence. While Cartesian coordinates are used in the above example, other types of coordinates may be used.

At block 412, based on a distance from the centroid location to the central fiber or the angle of incidence, the one or more processors 124 may adjust the focusing system 140 of the second communication device 122. For example, the one or more processors 124 may cause a tip-tilt mirror in the focusing system 140. In particular, the one or more processors may adjust the focusing system 140 according to the angle of incidence determined based on the location of the centroid of the received beam or an equivalent drive voltage or current determined to move the mirror by a desired angle. Adjusting the focusing system 140 may include moving a gimbal or a mirror of the focusing system 140 to change a pointing direction of an incoming beam to keep a focused spot of the beam centered on the optical fiber bundle 138. In particular, the adjustment may shift the centroid of the beam closer towards the central fiber or make the angle of incidence smaller (i.e., aimed more directly on the central fiber).

At block 414, the one or more processors 124 of the second communication device 122 may extract the data from the received beam. For example, the electrical signals generated at the output of the photodetectors may be used to calculate the angle information needed for the tracking system, while they are simultaneously combined into one signal for extracting the data bits. The electrical signals may be combined in a number of different ways. For example, they may be directly summed (known as "equal-gain combining"), or they may each be weighted and filtered prior to summation (in order to suppress the signals that have lower signal-to-noise ratio), or they may be digitized and processed in a nonlinear manner for optimal combining (e.g., maximum-likelihood combining). The one or more processors 124 may receive the combined signal from the plurality of photodetectors 139, detect a modulation of the combined signal (such as voltage or current) corresponding with the data, and extract the data. The extracted data may include routing instructions, which the one or more processors 124 may then execute.

At block 416, the one or more processors 124 may forward data bits from the extracted data as necessary along a routing path through the network. The routing path may be determined from routing instructions, destination information, or other routing information in the extracted data. The one or more processors 124 may transmit the data to a next hop for the data to be transmitted to a destination node or may fully extract data from the payload when the destination node is the second communication device 122. In some implementations, the extraction of data may occur at every node along a path through the network. In other implementations, the extraction of data may occur at edge nodes.

The features of the technology described herein may allow for a more accurate alignment between two communication devices. The boresight error that typically exists between a beacon beam detector and a communication beam detector may be eliminated, and a higher coupling efficiency of the laser beam to the central fiber may be achieved. The performance of the communication device may also be better through the lifetime of the system. The architecture of a given communication device may be simplified, cheaper, and smaller in size by removing components related to transmitting and receiving a beacon beam.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A free-space optical communication device comprising:
a focusing system configured to adjust a pointing direction or a focus length of a received optical communication beam;
an optical fiber bundle including:
a central fiber connected to a first photodetector, and
a plurality of surrounding fibers, each surrounding fiber connected to a corresponding second photodetector; and one or more processors in communication with the first photodetector, each second photodetector, and the focusing system, the one or more processors being configured to:
    receive a current or voltage generated at the first photodetector and each second photodetector;
    determine an angle of incidence of a beam received at the optical fiber bundle based on the current or voltage generated at the second photodetectors; and
    adjust, using the focusing system, a pointing direction or a focus length of the received beam based on the determined angle of incidence.

2. The free-space optical communication device of claim 1, wherein the optical fiber bundle includes four surrounding fibers.

3. The free-space optical communication device of claim 2, wherein the central fiber has a diameter of 130 microns, and the four surrounding fibers have diameters of 200 microns.

4. The free-space optical communication device of claim 1, wherein the focusing system includes a tip-tilt mirror.

5. The free-space optical communication device of claim 1, wherein the one or more processors are configured to determine the angle of incidence of the beam based on a location of a centroid of the beam relative to a center of the optical fiber bundle.

6. The free-space optical communication device of claim 5, wherein the one or more processors are configured to determine the location of the centroid of the beam relative to the center of the optical fiber bundle based on:
    an amount of power received through each surrounding fiber over a period of time, and
    an offset of a center of each surrounding fiber from a center of the central fiber.

7. A method for determining a pointing accuracy for an optical beam, the method comprising:
    receiving, at an optical fiber bundle that includes a central fiber and a plurality of surrounding fibers, an optical beam;
    generating, at each photodetector of a plurality of photodetectors configured to receive beam portions from the plurality of surrounding fibers in the optical fiber bundle, a current or voltage based on the received optical beam;
    determining, by one or more processors in communication with the plurality of photodetectors, an angle of incidence of the received optical beam relative to the central fiber based on the generated currents or voltages; and
    adjusting, by the one or more processors, a pointing direction or focus length of the received optical beam using a focusing system based on the determined angle of incidence.

8. The method of claim 7, wherein the plurality of surrounding fibers is four fibers having a same diameter.

9. The method of claim 7, further comprising receiving, at each photodetector of the plurality of photodetectors, a portion of the optical beam received at a fiber in the plurality of surrounding fibers.

10. The method of claim 9, wherein the generating, at each photodetector, of the current or voltage based on the received optical beam includes generating the current or voltage relative to an amount of energy in the portion of the optical beam.

11. The method of claim 7, wherein the determining of the angle of incidence of the received optical beam includes determining a location of a centroid of the received optical beam relative to the optical fiber bundle.

12. The method of claim 11, wherein the determining of the location of the centroid of the received optical beam relative to the optical fiber bundle includes combining electrical signals generated at each photodetector of the plurality of photodetectors into a single signal.

13. The method of claim 12, wherein the combining of electrical signals includes:
    summing the voltage or current received at each photodetector of the plurality of photodetectors over a period of time;
    multiplying the summed voltage or current of a given photodetector with an offset of a center of a corresponding surrounding fiber relative to a center of the central fiber to obtain a product for each photodetector; and
    summing the products of each photodetector.

14. The method of claim 11, wherein the location of the centroid includes Cartesian coordinates.

15. The method of claim 7, wherein the adjusting of the pointing direction or focus length of the received optical beam using a focusing system based on the determined angle of incidence includes moving a mirror in the focusing system.

16. The method of claim 7, further comprising extracting data from the received beam based on a modulation of a total current or voltage generated at the plurality of photodetectors and a second photodetector configured to receive a beam portion from the central fiber.

17. A tangible, non-transitory computer-readable storage medium configured to store instructions, the instructions, when executed by one or more processors, cause the one or more processors to perform a method, the method comprising:
    receiving a current or voltage from each photodetector of a plurality of photodetectors configured to receive portions of an optical beam from a plurality of fibers in an optical fiber bundle, the plurality of fibers surrounding a central fiber of the optical fiber bundle;
    determining an angle of incidence of the optical beam relative to the central fiber based on the received currents or voltages; and
    adjusting a pointing direction or focus length of the optical beam using a focusing system based on the determined angle of incidence.

\* \* \* \* \*